Jan. 29, 1946.  W. H. TAYLOR  2,393,942
VEHICLE ATMOSPHERIC SUSPENSION SYSTEM
Filed Dec. 11, 1944  2 Sheets-Sheet 1

INVENTOR
William H. Taylor
BY F.V.Hicks
ATTORNEY

Jan. 29, 1946.   W. H. TAYLOR   2,393,942
VEHICLE ATMOSPHERIC SUSPENSION SYSTEM
Filed Dec. 11, 1944   2 Sheets-Sheet 2
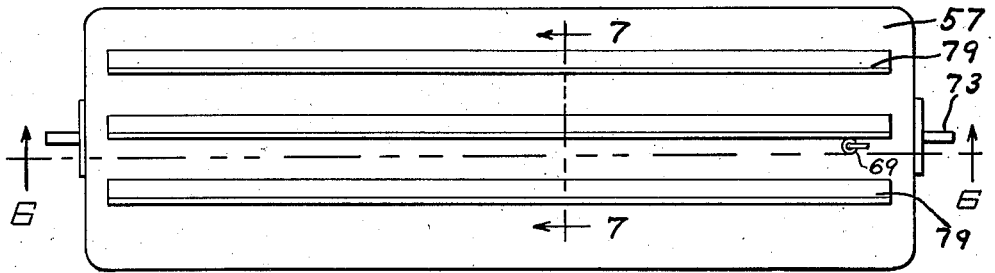
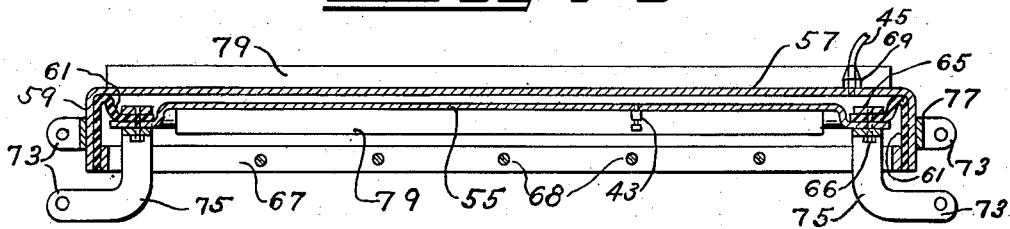
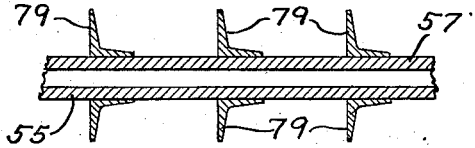
INVENTOR.
William H. Taylor
BY
ATTORNEY Patented Jan. 29, 1946

2,393,942

UNITED STATES PATENT OFFICE 2,393,942

VEHICLE ATMOSPHERIC SUSPENSION SYSTEM

William H. Taylor, Detroit, Mich.

Application December 11, 1944, Serial No. 567,772

4 Claims. (Cl. 280—104)

My invention pertains to a supporting and shock absorbing system for automotive and other types of vehicles.

It is an object of my invention to provide an improved system for more effectively absorbing and/or equalizing all road shocks imparted to the wheels by rough road surfaces before these shocks are transmitted to the vehicle chassis or body.

It is also an object of my invention to provide improved vehicle supporting and shock absorbing means wherein a partial vacuum is produced and utilized in such a manner that the atmospheric pressure is applied for carrying the load.

It is a further object of my invention to provide a vacuum suspension system for automotive vehicles wherein the vacuum may be effectively created and maintained even if there is a tendency to lose the partial vacuum due to slow leaks or absorption.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which:

Fig. 5 is a plan view partially broken away for showing the construction of an expansible chamber provided for use in my automobile suspension system;

Fig. 6 is a sectional view on line 6—6 in Fig. 5; and

Fig. 7 is an enlarged fragmentary view on line 7—7 showing the re-enforced construction of one of the rigid walls of the expansible chamber.

Figure 1:
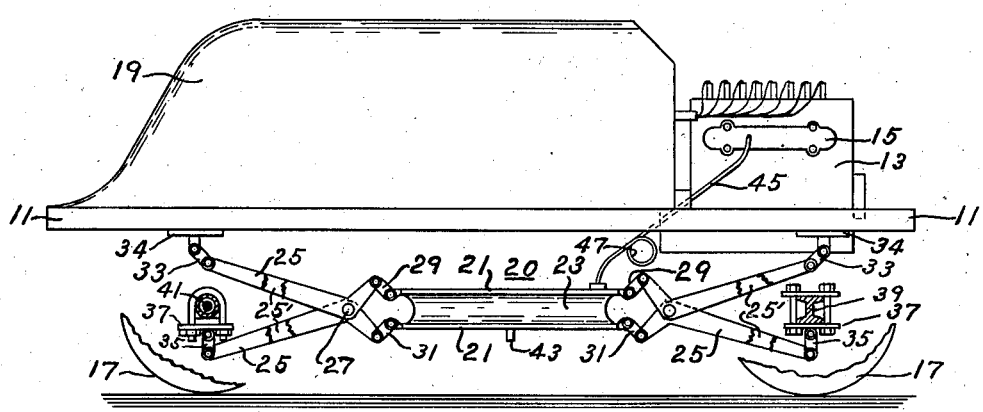
Fig. 1 is a side-elevational view, broken away and sectioned, and partially diagrammatic, representing an automobile vehicle provided with support means in accordance with my invention.

Referring more specifically to Fig. 1 of the drawings, I have illustratively disclosed my invention as applied to an automotive vehicle comprising a chassis 11 with an internal combustion engine 13 mounted therein, and having an intake manifold 15, in a usual manner. The chassis is carried by usual road wheels 17, and it may carry any conventional body 19, suitable for transportation of passengers or merchandise.

In accordance with my invention I support the vehicle chassis and body by atmospheric pressure through the use of vacuum chamber means 20. In one embodiment of my invention this is accomplished by a chamber which may comprise two walls 21 of any suitable rigid or semi-rigid construction, joined and sealed around the edges by flexible sealing means 23, whereby the two walls may be moved apart or together to vary the volume of the enclosed space, and hence the partial vacuum pressures of the confined gases.

Pairs of levers 25 are provided, and a lever of each pair is joined at some intermediate portion to a corresponding point on its mate as through a pivot pin 27, or any other suitable connection permitting relative movement therebetween in scissors fashion, which may be in a vertical plane as shown. The point of connection between the two levers of each pair is selected suitably to provide the desired leverage ratio between the opposite ends of the pairs of levers. One end of one lever of each pair is connected to one of the sidewalls 21 of the expansible chamber through relative movement means 29, which is represented as a linkage. The other corresponding lever end of each pair is similarly connected to the other wall 21 of the chamber through a link 31. The installation of the other two ends of each pair of levers consists in substituting these for the usual springs as by connecting through links 33 and 35 to the chassis, and to the road wheels respectively. The upper links 33 may be pivotally attached to anchor plates 34 mounted at suitable points on the bottom side of the chassis frame. The lower links 35 may swing from anchor plates 37 clamped or bolted to the under sides of the front and rear axles 39 and 41 respectively.

Figure 2:
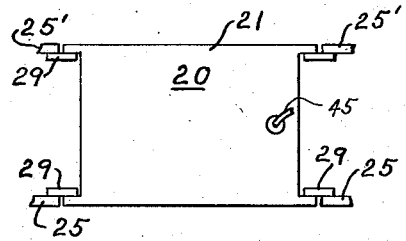
Fig. 2 is a plan view showing the arrangement of a single chamber with operative connections.

As straight levers would be inconvenient to arrange and connect, each lever 25 preferably has one end from the pivot 27 off-set angularly relative to the other end, as shown in Fig. 1, so that the links 29 act under tension to pull the sidewalls 21 of the chamber apart and create a partial vacuum in the chamber, rather than under compression as columns, in a criss-crossed arrangement. However, in some installations substantially straight levers may be so utilized if desired. Preferably four pairs of such scissors levers 25 are provided, the two pairs of remote levers 25′ being shown where portions of the adjacent levers are broken away in Fig. 1. When a single vacuum suspension chamber is to be used, as shown Figs. 1 and 2, of a square or rectangular conformation, one pair of levers is conveniently connected to each corner of each wall.

If, due to slow leakage atmosphere tends to enter the chamber and destroy the partial vacuum caused by the weight of the vehicle body, this is readily corrected by jacking up the body or chassis while opening a valve 43 to release some of the entrapped gasses from the chamber. Also in this manner the riding characteristics of the vehicle may be initially predetermined, or adjusted from time-to-time. To restore or maintain the partial vacuum in the chamber while the vehicle is in operation, a pipe 45 may be connected from the chamber into the intake manifold 15, as shown in Fig. 1, with slack 47 provided suitable to permit movement of the chamber relative to the vehicle.

Figure 4:
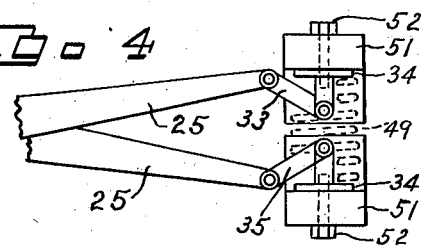
Fig. 4 is an enlarged fragmentary view, partially diagrammatic, showing how the system may be connected for independently mounted wheels.

The connections of the supporting ends of the levers 25 between the vehicle body and the wheels is readily adaptable to suit various different kinds of automobiles, as will be readily understood, it being in general a matter of connecting these ends of the levers to replace the springs and to support the loads previously carried thereby. Fig. 4 represents a well known type of independent wheel mounting which usually is provided with a coil spring 49, represented in dotted lines, between a pair of relatively movable members, or arms, 51, and shows how by removing the coil spring the support of the carrying ends of a pair of the levers 25 may be substituted in place of the spring. This, for example, is readily accomplished by securing, as by screws 52, to relatively movable members a pair of anchor plates 34 to which the carrying ends of the levers 25 are pivotally connected through the links 33 and 35, although these links may be omitted for connecting the arms 25 pivotally to the anchor plates 34, directly.

Figure 3:
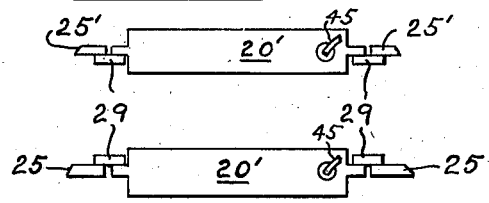
Fig. 3 is a plan view similarly to Fig. 2 but showing a different arrangement embodying a plurality of suspension chambers.

For convenience and flexibility of installation and arrangement, the pairs of levers 25 on each side of the vehicle may be provided with separate expansible chambers 20' mounted independently on each side of the vehicle, as represented in Fig. 3. In such installations, the vacuum maintaining pipe 45 is connected from both of the chambers into the intake manifold of the automotive vehicle. It will be apparent that a separate and independent expansible chamber may similarly be provided for each pair of levers 25, if desired.

Figs. 5, 6 and 7 show the construction of an expansible and collapsible chamber which may be provided for use in such atmospheric vehicle suspension systems. Such a chamber may comprise an inner wall 55 and an outer wall 57, the latter being of slightly greater length and width so that it extends beyond the margins of the inner wall. This outer wall is provided with a marginal flange 59 extending at right angles to its plane suitably for enclosing the marginal edges of the inner wall, rather closely while providing sufficient space therebetween for free relative movement between the inner and the outer walls. Flexible sealing means 61 is provided between the edges of the inner and the outer walls for sealing the enclosed space. This may be readily accomplished by means of a flexible gasket 61 of rubber, leather, or any suitable material, having one edge snugly secured and clamped to the outer edges of the inner wall, as by a seal ring 65 which may be firmly clamped thereon, as by screws 66 passing therethrough. Outer edges of the inner wall are preferably off-set by an amount equal to the thickness of the gasket and the clamp ring, so that a substantially continuous plane surface is presented toward the adjacent side of the outer wall. The outer edges of the gasket 61 are firmly secured and sealed around the inside of the marginal flange 59 of the outer wall, 68, as by a seal ring 67 which may be firmly clamped thereon, by screws, or other suitable fastening means. As shown, the outer wall is provided with a pipe coupling fixture 69 and a release valve 43 is mounted in the inner wall for the purposes previously described. But these may be mounted in either wall for convenience, as preferred. For support and attachment into the system suitable pairs of attachment lugs 73 are provided projecting from the respective relatively movable walls of the chamber. Each lug which moves the inner wall may project from a bracket 75 which is secured to and extends out from the inner wall and each lug to the outer wall may be on the end of a bracket 77 secured thereto. To provide rigidity or semi-rigidity, both walls may be reenforced by beams 79 such as structural steel in the form of angle iron, for example, extending in spaced relation along the surfaces of these walls, as shown in Fig. 7, and to which attachment may be made as by spot welding.

It is apparent that within the scope of my invention modifications and different arrangements may be made other than herein disclosed, and the present disclosure is illustrative merely, the invention comprehending variations thereof.

What I claim is:

1. A vehicle atmospheric suspension system comprising, a vehicle body, a plurality of road wheels for supporting and carrying said vehicle body, a plurality of pairs of levers, means pivotally joining the two levers of each pair at intermediate portions of the levers, expansible chamber means, relative movement means connecting one end of one lever of each pair of levers to one side of said expansible chamber means, relative movement means connecting each other corresponding adjacent lever end in each pair of levers to the other side of said expansible chamber means, and relative movement means connecting the other two ends of each pair of levers respectively to the said vehicle body and to said wheels to support the body by urging said chamber means to expanded condition.

2. A vehicle atmospheric suspension system in accordance with claim 1 and further characterized by said expansible chamber means comprising one chamber having two walls joined by flexible sealing means to maintain a partial vacuum therein.

3. An automotive road vehicle comprising, a vehicle body, an internal combustion engine having an intake manifold, a plurality of road wheels for supporting and carrying said vehicle body, expansible chamber means having substantial atmosphere exposed areas, a plurality of pairs of levers, means pivotally joining the two levers of each pair at intermediate portions of the levers for relative movement in scissors fashion, relative movement means connecting one end of one lever of each pair of levers to one side of said chamber means, relative movement means connecting each other corresponding adjacent lever end in each pair of levers to the other side of said chamber means, relative movement means connecting the other two ends of each pair of levers respectively to the said vehicle body and to said wheels to support the body by urging the chamber to its expanded condition, and conduit means connecting from said chamber means into the intake manifold of the engine for maintaining a partial vacuum in the chamber means while the engine is operating.

4. An automotive road vehicle in accordance with claim 3 and said expansible chamber means comprising one chamber having two walls joined by flexible sealing means.

WILLIAM H. TAYLOR.